US006852379B2

(12) United States Patent
Kasahara

(10) Patent No.: US 6,852,379 B2
(45) Date of Patent: Feb. 8, 2005

(54) INK-JET RECORDING PAPER

(75) Inventor: Kenzo Kasahara, Hino (JP)

(73) Assignee: Konica Corporation, Tokyo (JP)

( * ) Notice: Subject to any disclaimer, the term of this patent is extended or adjusted under 35 U.S.C. 154(b) by 187 days.

(21) Appl. No.: 10/237,493

(22) Filed: Sep. 6, 2002

(65) Prior Publication Data

US 2003/0118789 A1 Jun. 26, 2003

(30) Foreign Application Priority Data

Sep. 14, 2001 (JP) ....................................... 2001-279516

(51) Int. Cl.[7] .............................. B41J 2/01; B32B 5/16; B32B 3/26

(52) U.S. Cl. ................ 428/32.5; 428/32.25; 428/32.35; 428/32.37; 347/105

(58) Field of Search ............................ 428/32.5, 32.25, 428/32.35, 32.37; 347/105

(56) References Cited

U.S. PATENT DOCUMENTS 5,750,200 A * 5/1998 Ogawa et al.
5,912,071 A * 6/1999 Takeshita et al.

FOREIGN PATENT DOCUMENTS

EP 1016542 * 7/2000
EP 1048479 * 11/2000

OTHER PUBLICATIONS

Derwent Publ. XP002235476; Abst. of JP07/299959, Nov. 1995.*

* cited by examiner

*Primary Examiner*—Richard L. Schilling
(74) *Attorney, Agent, or Firm*—Squire, Sanders & Dempsey

(57) ABSTRACT

An ink-jet recording paper is disclosed. The ink-jet recording paper has a support and a porous ink receiving layer comprising fine filler particles having an average particle diameter of from 5 to 100 nm, and the ink receiving layer contains a polymer particle dispersion of a cationic or nonionic polymer having a glass transition point of from −30° C. to 40° C. and an average particle diameter of from 1 nm to 50 nm.

13 Claims, No Drawings

INK-JET RECORDING PAPER

FIELD OF THE INVENTION

The present invention relates to an ink-jet recording sheet.

BACKGROUND OF THE INVENTION

Ink-jet recording is carried out in such a manner that fine ink droplets are jetted onto a recording sheet such as a paper sheet, employing various working principles so that images and text are recorded. Said ink-jet recording exhibits advantages such as relatively high speed, low noise, and easy multicolor reproduction.

Conventional drawbacks with nozzle clogging and maintenance in said recording method have been overcome due to improvement of both inks and devices. As a result, at present, said recording method has been increasingly applied to various fields such as various types of printers, facsimile machines, and computer terminals.

Recently, said printers have been particularly improved so as to produce high quality images which approach conventional photographic image quality. Accordingly, needed are recording sheets capable of realizing conventional photographic quality and of further reproducing conventional photographic print-like properties (glossiness, smoothness and toughness).

As an example of the recording paper capable of forming such the high quality image, an ink-jet recording paper having a swelling type ink receiving layer is known. Such the recording paper gives a recorded image near a photographic image in the textile feeling thereof. On the other hand, the ink-jet recording system is developed so that the recording speed is raised. Accordingly, it is demanded that the recording paper has high ink absorption ability and a high drying speed. However, in the ink-jet recording paper having the swelling type ink receiving layer, the ink absorbing speed is low and a spot caused by combining of the ink droplets tends to be occurred in the recorded image when the image is formed by a high speed recording. Moreover, the recording paper has a drawback such that the ink tends to be spread when the printed image is stored under a high temperature condition.

To solve such the problems, an ink-jet recording paper improved in the ink absorbing speed and the anti-spreading ability is known, which has a porous ink receiving layer constituted by a little amount of a hydrophilic binder and a cross-linking agent, a large amount of a fine particle, hereinafter referred to as a filler fine particle, and a binder. The porous type ink receiving layer is classified into one mainly constituted by inorganic filler fine particles having an average particle diameter of approximately 1 $\mu$m and one mainly constituted by inorganic filler fine particles having an average particle diameter of 100 nm or less.

The recording paper using the inorganic filler fine particles having an average particle diameter of approximately 1 $\mu$m is insufficient in the smoothness of the surface and surface glossiness even though the ink absorbing speed is very high. Besides, in the recording paper using the inorganic filler fine particles having an average particle diameter of 100 nm or less, the ink absorbing speed is high and an image can be obtained, which has a highly smooth surface with a high glossiness and a textile feeling near that of the photograph.

However, the ink absorbing speed of the porous layer constituted by the inorganic filler fine particle having an average particle diameter of 100 nm or less is not always sufficient considering the raising of the recording speed in future. Consequently, further rising of the ink absorbing speed is demanded.

It is considerably effective for raising the ink absorbing speed to lower the content of the hydrophilic binder. In such the case, however, cracks in the coated layer are easily occurred in the course to the production since the adhering force between the filler fine particles is lowered. It is considered that the use of a binder with a low hydrophilicity or a hydrophobic binder is advantageous. However, such the layer is not suitable for the coating by an aqueous system and a problem on the environmental suitability is caused.

As a method for coating the hydrophobic binder by an aqueous system is known, by which the binder is added in a state of emulsion such as latex to an aqueous coating liquid. However, the ability for effectively binding the filler fine particles of the usually used binder emulsion is low since the average particle diameter of it is so large as from 200 nm to 1 $\mu$m and the surface area per weight is small. Such the tendency is made conspicuous when the filler fine particles having the average particle diameter of 100 nm or less are used.

On the other hand, in addition to said image quality and conventional-print like properties, higher level of durability as well as image retention properties has been demanded and much researches has been conducted to improve light fastness, moisture resistance, and water resistance to the level of silver halide photography. For example, regarding improvement of the light fastness, many techniques are disclosed in Japanese Patent Publication Open to Public Inspection Nos. 57-74192, 57-87989, 57-74193, 58-152072, 64-36479, 1-95091, 1-115677, 3-13376, 4-7189, 7-195824, 8-25796, 11-321090, 11-277893, 2000-37951.

In addition to the light fastness problem, porous type recording sheets have a problem in which, due to the multiple-void structure, discoloration and fading tend to occur due to harmful gases. Water-soluble phthalocyanine based dyes, which are employed in common color ink-jet printers, tend to result in said problem.

The mechanism of said discoloration and fading has not yet been fully clarified. However, it is assumed that a very small amount of active harmful gases such as ozone, oxidants, $SO_x$, and $NO_x$ in ambient air decomposes said dyes, since the multiple-void structure has a large surface area and an active surface of inorganic fine particles.

Techniques for reducing said discoloration and fading are described in Japanese Patent Publication Open to Public Inspection Nos. 63-252780, 64-11877, 1-108083, 1-216881, 1-218882, 1-258980, 2-188287, 7-237348, 7-266689, 8-164664, and others. However, recording sheets for producing photographic image quality, utilizing a finer multiple-void structure than conventional, tend to be more readily degraded. Accordingly, conventional improvement techniques have not resulted in sufficient effects and more essential improvement has been demanded.

Said swelling type recording sheets tend to result in fewer such problems, but exhibit inherent difficulty to improve the low ink absorption rate.

It is possible to overcome discoloration and fading problems by utilizing an ink-jet recording method in which a pigment-based ink is used. However, drawbacks such as bronzing on the recording sheet surface have not been overcome so as to result in sufficiently acceptable image quality in terms of overall product quality. Further, the following gas insulation methods are very effective: prints are subjected to a lamination treatment or placed in a frame, or as described in Japanese Patent Publication Open to Public Inspection Nos.53-27426, 59-222381, 62-271781, 11-157207, 11-245507, and 2000-71608, recording sheets, comprising fine thermoplastic particles on the surface, are printed, and subsequently heated or pressed to result in formation of a gas insulation layer. However, each of said methods needs a post-treatment to result in an additional manufacturing process.

SUMMARY OF THE INVENTION

The object of the invention is to give both of the suitable ink absorbing speed and the anti-cracking ability to the porous type ink-jet recording paper and to prevent the degradation of the image by a harmful gas without any specific processing.

The invention and its embodiment are described.

An ink-jet recording paper of the invention has a support and a porous ink receiving layer comprising fine filler particles having an average particle diameter of from 5 to 100 nm, and the ink receiving layer contains a polymer particle dispersion of a cationic or nonionic polymer having a glass transition point of from −30° C. to 40° C. and an average particle diameter of from 1 nm to 50 nm. The glass transition point is preferably not more than 20° C. and more preferably not more than 0° C.

The ink-jet recording paper is preferably has the porous ink receiving layer composed of at least two layers and the outermost layer of the porous ink receiving layer contains the polymer particle dispersion.

The filler particles are preferably composed of inorganic fine particles and organic fine particles, and the inorganic fine particle having a refractive index of from 1.3 to 1.8 and the organic fine particles having a glass transition point of from 70° C. to 150° C.

The organic fine particles are capable of being dissolved or swollen by a water-miscible solvent.

The preferable example of the polymer of the polymer particle dispersion is a homo-polymer of an ethylene monomer such as an acrylate, a methacrylate, a vinyl compound and a styrene compound; and homo-or co-polymer of a diene monomer such as butadiene and isoprene; and a urethane polymer and a polyester compound.

The content of the polymer particles is preferably from 0.1 to 30%, more preferably from 0.5 to 15%, by weight of the fine particles.

The porous ink receiving layer preferably further comprises a hydrophilic binder. The most preferable binder is polyvinylalcohol.

The porous ink receiving layer preferably further comprises a cationic polymer. Examples thereof includes polyethyleneimine, polyallylamine, polyvinyl amine, dicyandiamide polyalkylene polyamine condensation products, polyalkylene polyamine dicyandiamide ammonium salt condensation products, dicyandiamide formalin condensation products, epichlorohydrin-dialkylamine condensation products, diallyldimethylammonium chloride polymers, diallyldimethylammonium chloride $SO_2$ copolymers, polyvinylimidazole, vinylpyrrolidone vinylimidazole copolymers, polyvinylpyridine, polyamidine, chitosan, cationized starch, vinylbenzyltrimethylammonium chloride polymers, (2-methacroyloxyethyl) trimethylammonium chloride polymers, and dimethylaminoethyl methacrylate polymers.

The porous ink receiving layer preferably further comprises a hardener. Most preferable example of the hardener is boric acid or salts thereof.

In the ink-jet recording paper the porous ink receiving layer is provided on a support by coating a liquid containing a dispersion of the polymer having an average particle size of from 1 nm to less than 50 nm.

DETAILED DESCRIPTION OF THE INVENTION

The invention is described in detail below. The recording paper according to the invention has an ink-absorbing layer on at least one side of the support.

The recording paper has a porous ink receiving layer since a high ink absorbing speed is required to obtain good image quality. The shape of the pore can be confirmed by electron-microscopic observation.

It is preferable that the pores are connected with each other and not isolated. In such the case, the diameter of the pore can be defined by the value measured by, for example, a mercury intrusion porosimetry.

For constituting the porous ink receiving layer, the layer is filled by the filler fine particle so that the space between the filler fine particles is made as the pore. The average particle diameter of the filler fine particles has to be not more than 100 nm. The average diameter of from 10 to 50 nm is preferable for obtaining a high glossiness and a printing image density.

The average diameter of the filler fine particles can be determined by a method in which the diameters of optionally selected plural particles are measured by electron-microscopic observation of the cross section or the surface of the layer containing the filler fine particles and the simple average, or number average, of thus measured particle diameter is calculated. The diameter of each of the particles is represented by the diameter of a circle having an area the same as the projection area of the particle. The average diameter can also be determined by a method by which the filler fine particles are dispersed in a suitable medium and the average diameter is measured by a laser diffraction scattering particle size distribution measuring apparatus. The shape of the filler fine particle may be needle-like or planer and may not be true sphere. The average particle diameter can be determined from the sphere corresponding volume.

The filler fine particles may be composed of either a primary particle or a secondary particle; the average particle diameter is defined by the average diameter of the highest order particle observed in the dried layer.

The material of the filler fine particles may be either inorganic fine particles or organic particles. The inorganic particles and the organic particles are preferably used as the inorganic filler fine particles and the organic filler fine particles, respectively.

Examples of the inorganic filler fine particle include a white pigment such as light calcium carbonate, heavy calcium carbonate, magnesium carbonate, kaolin, clay, talk, calcium sulfate, barium sulfate, titanium oxide, zinc oxide, zinc hydroxide, zinc sulfide, zinc carbonate, hydrotalcite, aluminum silicate, diatomite, calcium silicate, magnesium silicate, synthesized amorphous silica, colloidal silica, alumina, colloidal alumina, pseudboehmite, aluminum hydroxide, lithopone, zeolite and magnesium hydroxide.

The use of the inorganic filler fine particle having a refractive index of from 1.3 to 1.8 is preferable to obtain a high print image density. Preferable inorganic filler fine particle is silica or alumina. Among them, silica produced by a gas phase method, silica produced by a precipitation method and alumina having a pseudboehmite structure.

Examples of the organic filler fine particle include a plastic pigment and a wax particle. The material of the organic filler fine particle, includes materials such as a poly(vinyl chloride), a poly(vinylidene chloride), a polyacrylate, a polymethacrylate, an elastomer, an ethylene-vinyl acetate copolymer, a polyester, a poly(vinyl ether), a poly(vinyl acetal), a polyamide, a polyurethane, a polyolefin, SBR, NBR, a polytetrafluoroethylene, a chloroprene, a protein, a polysaccharide, a rosin ester and a shellac resin each having a glass transition point of higher than the room temperature. Particularly preferable material of the organic filler fine particle is polystyrene, poly(methyl methacrylate), a copolymer of (meth)acrylate, and a styrene-(meth)acrylate copolymer. A resin composed of two or more monomers formed by modification or copolymerization is preferably usable. A resin added with a specific modification group or that from which a releasing group is removed. A wax material containing a metal stearate is also may be used as the material of the organic filler fine particle.

The organic filler fine particle may be formed by mixing two or more kinds of material. A mixture of two or more kinds of organic filler fine particle may be used.

The glass transition point Tg of the organic filler fine particle according to the invention is preferably within the range of from 70° C. to 150° C. When the transition point is lower than the foregoing range, the adhesion by fusion of the organic filler fine particle tends to be occurred. Consequently, there is the possibility that the pores at the surface of the recording paper are reduced in the size or the number thereof and the absorption of the ink is hindered.

In the invention, a combined particle constituted by the inorganic filler fine particle and a little amount of organic polymer is substantially regarded as the inorganic filler fine particle. In such the case, the average particle diameter is also defined by that of the highest order particles observed in the dried layer. The weight ratio of the organic polymer/inorganic filler fine particle in the combined particle constituted by the inorganic filler fine particle and a little amount of the organic polymer is usually from 1/100 to 1/4. Example of such the combined particle is described in Japanese Patent Publication Open to Public Inspection No. 11-321079.

The polymer dispersion to be used in the invention is the dispersed phase in an aqueous emulsion such as latex which is usually composed of an organic resin.

Examples of the resin employed in the polymer dispersion include a homo-polymer of an ethylene monomer such as an acrylate, a methacrylate, a vinyl compound and a styrene compound; and homo-or co-polymer of a diene monomer such as butadiene and isoprene; and a urethane polymer and a polyester compound. The polymer preferably has Tg of −30 to 40° C. General polymers may be preferably used.

The polymer particles of the polymer dispersion provides the softness to the porous layer at the time of formation thereof and forms the porous layer by fusion and adhesion at the time of drying the coated layer. For such the purpose, the glass transition point of the polymer has to be not more than 40° C., preferably not more than 20° C., more preferably not more than 0° C.

In the invention, the essential difference between the organic filler fine particle and the polymer dispersion is the thermal property thereof, and the polymer dispersion is one which forms a continuous film when that is dried at 40° C. while many particles thereof are contacted with each other, and the organic filler fine particle is one which holds the shape of particle and forms the pore in the period of the drying. The glass transition point of the polymer dispersion is not more than 40° C. and that of the organic filler fine particle is not less than 70° C. The preferable glass transition point is obtained by selecting monomers and their content ratio.

The glass transition point Tg of the organic filler fine particle and the polymer dispersion according to the invention can be calculated from the Tg of the homopolymer of the monomer constituting the copolymer of the dispersion and the ratio of the monomer in the copolymer by the proportion of the weight. For example, Tg of a copolymer composed of styrene having a Tg of homopolymer thereof of 100° C.=373 K and n-butyl acrylate having a Tg of homopolymer thereof of −54° C.=219 K in a ratio of 4:1 is calculated as follows:

$$1/\{(1/373\ K)\times 4/5+(1/219\ K)\times 1/5\}=327\ K=54°\ C.$$

As to the Tg of the homopolymer of a monomer, many measured values are described in "Polymer Handbook", A Willey-Interscience Publication.

The average particle size of the polymer dispersion is not more than 50 nm, preferably from 1 to 50 nm, and more preferably from 5 to 30 nm, in view of sufficient density of the printed image as well as sufficient effect of providing the softness to the layer.

The average particle diameter of the dispersed polymer is less than 50 nm, preferably from 5 to 30 nm even though some times the shape and the particle size before the preparation of the layer are not kept since the particles are adhered by fusion with together at the period of the coating and drying of the layer. It is supposed that the effect of the invention can be enhanced by the use of the polymer having the particle of the average diameter of less than 50 nm since the size corresponding to the size of the polymer dispersion is maintained even when the particles are adhered by fusion at the period of the coating and drying of the layer in such the case.

The organic filler fine particle and the polymer dispersion according to the invention are each frequently synthesized by an emulsion polymerization method in an aqueous medium. The average particle diameter thereof may be controlled by a method such as controlling the kind and the amount of the emulsifying agent and controlling of the monomer composition.

The content of the polymer dispersed is preferably from 0.1 to 30%, more preferably from 0.5 to 15%, by weight of the filler fine particle.

Although the majority of usual polymer dispersion is anionic one, it has to be cationic or nonionic one in the invention since the anionic polymer dispersion frequently increases the occurrence of the crack.

Polarity of ion of the polymer dispersion depends on not only that of the polymer but also polarity of emulsifying agent added to the dispersion. The polymer dispersion according to the invention can be obtained by dispersing the polymers having no polarity with cationic or nonionic emulsifying agent, or may be so called self emulsion type polymer dispersion.

Preferable layer arrangement of the recording material according to the invention is exemplified.

(1) A single layer comprising inorganic filler particles as a major component and the polymer dispersion according to the invention is provided on a support.

(2) A plurality of layers, in which each layer comprises inorganic filler particles as a major component and the outermost layer further comprises the polymer dispersion according to the invention, is provided on a support.

(3) A layer comprising inorganic filler particles as a major component (under layer) and a layer comprising organic filler particles as a major component and the polymer dispersion according to the invention (upper layer) is provided on a support in this order.

The major component means that the component occupies 50 percent by weight or more in a solid state. In any layer may comprises the inorganic filler particles as well as an organic filler particles, wherein ratio by weight of the inorganic filler particles to the organic filler particles is 10/0 to 8/2 for the cases (1) and (2) mentioned above, and 0/10 to 4/6 for the upper layer, 10/0 to 8/2 for the under layer of case (3) mentioned above.

The filler preferably composed of inorganic fine particles and organic fine particles. The polymer dispersion according to the invention is more effectively applied to the porous layer comprising the inorganic filler fine particle and the organic filler fine particle compared to the use to the porous layer comprising only the inorganic fine particle. The layer of the organic filler fine particle is generally has a low porosity and the use of a water-soluble binder such as poly(vinyl alcohol) considerably lowers the ink absorbing speed. Moreover, the polymer dispersion according to the invention remarkably displays the inhibiting effect to the crack occurrence at the time of production since the polymer dispersion has a high adhesiveness with the organic filler fine particles.

The organic filler fine particle is preferably used for preventing the discoloration as later-described even though it can be used for various purposes.

According to the find by the inventors, it is preferable for preventing the discoloration that the ink absorbing speed at the area of the recorded image after image recording is made slower than that before the image recording.

Examples of the method for lowering the ink absorbing speed after the image recording include the following means: (1) the pores are disappeared, (2) the number of the pore is decreased and (3) the diameter of the pore is reduced.

The reduce of the number of the pores is preferable; it is preferable that the height of the maximum peak being between 0.01 to 1 $\mu$m of the diameter distribution of the pores is reduced by not more than 40%. Moreover, the decreasing of the diameter of the pore is preferable; it is preferred that the pore diameter is decreased after the recording to not more than 60% of that before the recording when the maximum peak being within the range of from 0.01 to 1 $\mu$m of the pore diameter distribution is defined as the pore diameter. It is most preferred situation that no pore is observed by the electron-microscopic observation of the surface of the image recorded portion of the recording paper.

It has been found by the inventors that the use of an organic filler fine particle dissolvable in a water-miscible organic solvent is remarkably effective as the concrete means for realizing the above-mentioned shape variation of the pore.

Water contained in the ink is gradually evaporated after the ink is jetted on the recording paper and the evaporation speed of the water-miscible organic solvent contained in the ink is usually slower than that of the water. Consequently, the ratio of the water-miscible organic solvent in the liquid remained in the recording paper is gradually raised. Therefore, the substance soluble in the water-miscible organic solvent and insoluble in water begins to be dissolved little by little. Namely, when an image is recorded by the ink onto the recording paper containing the organic filler fine particle capable of being dissolved or swollen in the water-miscible organic solvent contained in the ink, the pore can be closed or made small by the partially or wholly dissolving or swelling of the organic filler fine particle after drying of the ink.

Accordingly, it is preferred that the organic filler fine particle relating to the invention is one capable of being dissolved or swollen by the water-miscible organic solvent. The preferable water-miscible organic solvent is described later.

The thickness of the layer containing the organic filler fine particle is preferably from 0.1 to 5 $\mu$m. When the layer thickness is smaller than such the region, the discoloring prevention effect is insufficient; and when the thickness is larger than that range, there is a possibility that both of the density of the printed image and the ink absorbing speed are lowered. A lower layer of the ink receiving layer mainly constituted by the inorganic filler fine particle is preferably provided at a portion nearer the support to supplement the ink absorbing ability of the outermost layer. The thickness of the layer mainly constituted by the inorganic filler fine particle is preferably from 5 to 50 $\mu$m.

The porosity of the layer containing the organic filler fine particle is generally low and the thickness thereof is made too large if the ink receiving layer is constituted by such the layer only. Contrary, the porous layer mainly constituted by the inorganic filler fine particle can absorb much ink even when the thickness is small since such the layer has a large porosity. Therefore, it is preferable to form the ink receiving layer having both of the layer containing the organic filler fine particle and the porous layer mainly constituted by the inorganic filler fine particle. The thickness of the organic filler containing layer is preferably from 0.1 to 30%, more preferably from 0.5 to 20%, of the ink receiving layer.

In the invention, a hydrophilic binder may be used in the range in which the effect of the invention is not inhibited.

Listed as examples of hydrophilic binders, employed in said ink absorptive layer, are polyvinyl alcohol, gelatin, polyethylene oxide, polyvinylpyrrolidone, polyacrylic acid, polyacrylamide, polyurethane, dextran, dextrin, carrageenan ($\kappa$, $\iota$, and $\lambda$), agar, Pullulan, water-soluble polyvinyl butyral, hydroxyethyl cellulose, and carboxymethyl cellulose. Said hydrophilic binders may be employed in combination of two or more types. The hydrophilic binder preferably employed in the present invention is polyvinyl alcohol.

In addition to common polyvinyl alcohol which is obtained by hydrolyzing polyvinyl acetate, said polyvinyl alcohol includes modified polyvinyl alcohol which is obtained by being subjected to cationic modification of the terminals, or anionic modification or anion modified polyvinyl alcohol having an anionic group.

The average degree of polymerization of preferably employed polyvinyl alcohol, prepared by hydrolyzing vinyl acetate, is preferably at least 1,000, and is more preferably from 1,500 to 5,000. The saponification ratio is preferably from 70 to 100 percent, and is most preferably from 80 to 99.5 percent.

Said cation modified polyvinyl alcohol includes polyvinyl alcohol having a primary, secondary, or tertiary amino group, or a quaternary ammonium group in its main chain or side chain as described, for example, in Japanese Patent Publication Open to Public Inspection No. 61-10483, and is prepared by copolymerizing an ethylenic unsaturated monomer, having a cationic group, with vinyl acetate.

Two or more polyvinyl alcohols, which are different from each other in the degree of polymerization and modified types, may be employed in combination.

The added amount of inorganic filler fine particles, employed in said ink absorptive layer, varies markedly depending on the required ink absorption capacity, the void ratio of the porous layer, the types of inorganic filler fine particles, and the type of hydrophilic binders. However, said added amount is generally from 5 to 30 g per $m^2$ of the recording sheet, and is preferably from 10 to 25 g.

Further, the ratio of inorganic filler fine particles employed in said ink absorptive layer to the hydrophilic binders is generally from 2:1 to 20:1, and is most preferably from 3:1 to 10:1.

In order to minimize the bleeding of images during storage after recording, cationic polymers are preferably employed.

Cited as examples of cationic polymers may be polyethyleneimine, polyallylamine, polyvinyl amine, dicyandiamide polyalkylene polyamine condensation products, polyalkylene polyamine dicyandiamide ammonium salt condensation products, dicyandiamide formalin condensation products, epichlorohydrin-dialkylamine condensation products, diallyldimethylammonium chloride polymers, diallyldimethylammonium chloride $SO_2$ copolymers, polyvinylimidazole, vinylpyrrolidone vinylimidazole copolymers, polyvinylpyridine, polyamidine, chitosan, cationized starch, vinylbenzyltrimethylammonium chloride polymers, (2-methacroyloxyethyl) trimethylammonium chloride polymers, and dimethylaminoethyl methacrylate polymers.

Further, listed as said polymers are cationic polymers described in "Kagaku Kogyo Jiho (Chemical Industry Update)", Aug. 15 and 25, 1998, and polymer dye fixing agents described in "Kobunshi Yakuzai Nyumon (Introduction to Polymer Pharmaceuticals)", published by Sanyo Kasei Kogyo Co., Ltd.

In order to regulate the physical strength of the ink absorptive layer as well as to minimize cracking of the coated layer during coating and drying, it is preferable that hardeners be incorporated into the ink-jet recording sheet of the present invention.

Said hardeners are generally compounds which have a group capable of reacting with said hydrophilic binders, or compounds which promote reaction between different groups of said hydrophilic binders. They are suitably selected and employed depending on the type of hydrophilic binders.

Listed as specific examples of hardeners are, for example, epoxy based hardeners (diglycidyl ethyl ether, ethylene glycol diglycidyl ether, 1,4-butanediol diglycidyl ether, 1,6-diglycidylcyclohexane, N,N-glycidyl-4-glycidylpxyaniline, sorbitol polyglycidyl ether, and glycerol polyglycidyl ether), aldehyde based hardeners (formaldehyde and glyoxal), active halogen based hardeners (2,4-dichloro-4-hydroxy-1,3,5-s-trizine, and bisvinylsulfonyl methyl ether), boric acid and salts thereof, borax, and aluminum alum.

When polyvinyl alcohol and/or cation modified polyvinyl alcohol is employed as the particularly preferred hydrophilic binder, it is preferable that hardeners, selected from boric acid and salts thereof, and epoxy based hardeners are employed. The most preferable hardeners are those selected from boric acid and salts thereof.

Boric acid or salts thereof refer to oxygen acid having a boron atom as the central atom and salts thereof, and specifically include orthoboric acid, diboric acid, metaboric acid, tetraboric acid, pentaboric acid, and octaboric acid, and salts thereof.

The employed amount of said hardeners varies depending on the types of hydrophilic binders, the types of hardeners, the types of inorganic filler fine particles, and the ratio of the hardeners to the hydrophilic binders. The amount is generally from 5 to 500 mg per g of the hydrophilic binder, and is preferably from 10 to 300 mg.

In addition to said additives, various other additives may be incorporated into the ink absorptive layer, as well as other layers which may be desired for the ink recording sheet of the present invention. The following various types of additives, known in the art cited as incorporated examples may be: various types of cationic or nonionic surface active agents; UV absorbers described in Japanese Patent Publication Open to Public Inspection Nos. 57-74193, 57-87988, and 62-261476; anti-fading additives described in Japanese Patent Publication Open to Public Inspection Nos. 57-74192, 57-87989, 60-72785, 61-146591, 1-95091, and 3-13376; brightening agents described in Japanese Patent Publication Open to Public Inspection Nos. 59-42993, 59-52689, 62-280069, 61-242871, and 4-219266; pH regulators such as sulfuric acid, phosphoric acid, citric acid, sodium hydroxide, potassium hydroxide, and potassium carbonate; antifoaming agents, antiseptics, thickeners, antistatic agents, and matting agents.

The ink absorptive layer may be comprised of two or more layers. In this case, composition of each ink absorptive layer may be the same or different.

Suitably employed as supports employed in the present invention may be ink-jet recording sheets known in the art. They may be water-absorptive supports but are preferably non-water-absorptive supports.

Listed as water-absorptive supports capable of being employed in the present invention may be, for example, common paper, cloth, and sheets and boards comprised of wood. Of these, paper is particularly preferred due to the excellent water absorbability of the base material itself, and low cost. Employed as paper supports may be those which are prepared by employing, as the main raw materials, wood pulp such as chemical pulp such as LBKP and NBKP, mechanical pulp such as GP, CGP, RMP, TMP, CTMP, CMP, and PGW, and waste paper pulp such as DIP. Further, if desired, suitably employed as raw materials may be various types of fibrous materials such as synthetic pulp, synthetic fibers, and inorganic fibers.

If necessary, various types of additives, known in the art, such as sizing agents, pigments, paper strength enhancing agents, fixing agents, optical brightening agents, wet paper strengthening agents, and cationic agents, may be incorporated into said paper supports.

It is possible to produce paper supports as follows. Fibrous materials such as wood pulp and various additives are blended and the resulting blend is applied to any of the various paper making machines such as a Fourdrinier paper machine, a cylinder paper machine, and a twin wire paper machine. Further, if necessary, it is possible to carry out a size press treatment employing starch and polyvinyl alcohol, various coating treatments, and calender finishing during paper making processes or in said paper making machine.

Non-water-absorptive supports capable of being preferably employed in the present invention include transparent supports as well as opaque supports. Listed as said transparent supports are films comprised of materials such as polyester resins, diacetate resins, triacetate resins, acrylic based resins, polycarbonate based resins, polyvinyl chloride based resins, polyimide based resins, cellophane, and celluloid. Of these, when employed for Overhead Projectors, those, which are radiation heat resistant, are preferred, and polyethylene terephthalate is particularly preferred. The thickness of said transparent supports is preferably from 50 to 200 $\mu$m.

Preferred as said opaque supports are, for example, resin coated paper (being so-called RC paper) in which at least one surface of the base paper is covered with a polyolefin resin layer comprised of white pigment, and so-called white PET prepared by incorporating white pigments such as barium sulfate into said polyethylene terephthalate.

For the purpose of enhancing the adhesion between said various supports and the ink absorptive layer, it is preferable that prior to coating said ink absorptive layer, said supports are subjected to a corona discharge treatment, as well as a subbing treatment. Further, the ink-jet recording sheets of the present invention are not necessary to be white and may be tinted.

It is particularly preferable that employed as the ink-jet recording sheets of the present invention be polyethylene laminated paper supports because recorded images approach conventional photographic image quality, and high quality images are obtained at relatively low cost. Said polyethylene laminated paper supports will now be described.

Base paper, employed in said paper supports, are made employing wood pulp as the main raw material, if necessary, together with synthetic pulp such as polypropylene and synthetic fiber such as nylon and polyester. Employed as said wood pulp may be any of LBKB, LBSP, NBKP, NBSP, LDP, NDP, LUKP, or NUKP. It is preferable that LBKP, NBSP, LBSP, NDP, and LDP, which are comprised of shorter fiber, are employed in a greater amount. However, the ratio of LBSP and/or LDP is preferably from 10 to 70 percent by weight.

Preferably employed as said pulp is chemical pulp (sulfate pulp and sulfite pulp). Further, also useful is pulp which has been subjected to a bleach treatment to increase its whiteness.

Into said base paper suitably incorporated may be sizing agents such as higher fatty acids and alkylketene dimers; white pigments such as calcium carbonate, talc, and titanium oxide; paper strength enhancing agents such as starch, polyacrylamide, and polyvinyl alcohol; optical brightening agent; moisture maintaining agents such as polyethylene glycols; dispersing agents; and softeners such as quaternary ammonium salts.

The degree of water freeness of pulp employed for paper making is preferably from 200 to 500 ml under CSF Specification. Further, the sum of weight percent of 24-mesh residue and weight percent of 42-mesh calculated portion regarding the fiber length after beating, specified in JIS-P-8207, is preferably between 30 and 70 percent. Further, the weight percent of 4-mesh residue is preferably 20 percent by weight or less.

The weight of said base paper is preferably from 30 to 250 $g/m^2$, and is most preferably from 50 to 200 $g/m^2$. The thickness of said base paper is preferably from 40 to 250 $\mu$m.

During the paper making stage or after paper making, said base paper may be subjected to a calendering treatment to result in excellent smoothness. The density of said base paper is generally from 0.7 to 1.2 $g/m^3$ (JIS-P-8118). Further, the stiffness of said base paper is preferably from 20 to 200 g under the conditions specified in JIS-P-8143.

Surface sizing agents may be applied onto the base paper surface. Employed as said surface sizing agents may be the same as those above, capable of being incorporated into said base paper.

The pH of said base paper, when determined employing a hot water extraction method specified in JIS-P-8113, is preferably from 5 to 9.

Polyethylene, which is employed to laminate both surfaces of said base paper, is mainly comprised of low density polyethylene (LDPE) and/or high density polyethylene (HDPE). However, other LLDPE or polypropylene may be partially employed.

Specifically, as is generally done with photographic paper, the polyethylene layer located on the ink absorptive layer side is preferably constituted employing polyethylene into which rutile or anatase type titanium oxide is incorporated so that opacity as well as whiteness is improved. The content ratio of said titanium oxide is generally from 3 to 20 percent by weight with respect to polyethylene, and is more preferably from 4 to 13 percent by weight.

It is possible to employ said polyethylene coated paper as glossy paper. Further, in the present invention, it is possible to employ polyethylene coated paper with a matt or silk surface, as obtained in the conventional photographic paper, by carrying out an embossing treatment during extrusion coating of polyethylene onto said base paper.

In said polyethylene coated paper, it is preferable to maintain a paper moisture content of 3 to 10 percent by weight.

It is possible to apply various types of ink absorptive layers, such as a porous layer and a sublayer, arranged as required, onto a support, employing a method selected from those known in the art. The preferred methods are that the coating composition constituting each layer is applied onto a support and subsequently dried. In this case, it is possible to simultaneously apply two or more layers onto said support, and simultaneous coating is particularly preferred in which all hydrophilic binder layers are simultaneously coated.

Employed as coating methods are a roll coating method, a rod bar coating method, an air knife coating method, a spray coating method, and a curtain coating method. In addition, preferably employed is the extrusion coating method employing a hopper, described in U.S. Pat. No. 2,681,294.

When each non-recorded area of the ink-jet recording sheets, described in the invention, is subjected to Bristow's Measurement, the water absorption amount of said non-recorded area is preferably from 10 to 30 $ml/m^2$ during a contact time of 0.8 second.

Listed as specific examples of ejection systems of the ink-jet recording of the present invention may be an electrical-mechanical conversion system (for example, a single cavity type, a double cavity type, a bender type, a piston type, a share mode type, and a shared wall type), an electrical-thermal conversion system (for example, a thermal ink-jet type, and a bubble jet type), and an electrostatic suction type (for example, an electric field control type and a slit jet type), and a discharge system (for example, a spark jet type).

The ink employed in the present invention is a water-soluble dye ink known in the art, and comprises water, water-soluble organic solvents, and water-soluble dyes and further it is possible to add other additives, if necessary. Specifically, water-soluble organic solvents are incorporated, without fail, for the purpose of minimizing dye deposition near nozzles due to drying. Said water-soluble organic solvents are any of the organic solvents which are soluble in water, and may be employed in combination of several types. The boiling point of said organic solvents is preferably 120° C. or higher. Further, it is preferable that water-soluble organic solvents having an SP (being a solubility parameter) of 18.414 to 30.69 are incorporated in an amount of 10 to 30 percent by weight.

The SP (Solubility Parameter) value, as described herein, refers to the solubility parameter and is an important scale to estimate the solubility of substances. Herein, a unit is $[MPa]^{1/2}$ which is a value at 25° C. Said SP values of organic solvents are described on page IV-337 of J. Brandrup, et al., "Polymer Handbook", A Wiley-Interscience Publication, and other publications.

Listed as examples of water-soluble organic solvents are alcohols (for example, butanol, isobutanol, secondary butanol, tertiary butanol, pentanol, hexanol, cyclohexanol, and benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thioglycol); alkyl ethers of polyhydric alcohol (for example, ethylene glycol monomethyl ether, ethylene glycol monoethyl ether, ethylene glycol monobutyl ether, ethylene glycol dimethyl ether, diethylene glycol monomethyl ether, diethylene glycol monoethyl ether, diethylene glycol monobutyl ether, diethylene glycol dimethyl ether, diethylene glycol diethyl ether, triethylene glycol monoethyl ether, triethylene glycol monomethyl ether, triethylene glycol monobutyl ether, triethylene glycol diethyl ether, triethylene glycol dimethyl ether, tetraethylene glycol monomethyl ether, tetraethylene glycol monoethyl ether, tetraethylene glycol monobutyl ether, tetraethylene glycol dimethyl ether, and tetraethylene glycol diethyl ether); amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, tetraethylenepentamine, polyethyleneimine, pentamethyldiethylenetriamine, and tatramethylpropylenediamine); amides (for example, formamide, N,N-dimethylformamide, and N,N-dimethylacetamide); heterocycles (for example, 2-pyrrolidone, N-methyl-2-pyrrolidone, cyclohexylpyrrolidone, 2-oxazolidone, and 1,3-dimethyl-2-imidazilidinone); sulfoxides (for example, dimethylsulfoxide); and sulfones (for example, sulfolane).

Particularly preferred water-soluble organic solvents are polyhydric alcohol, alkyl ethers of polyhydric alcohols, and heterocycles, and 2 or 3 types are preferably selected from them. Preferably employed as hydrophilic organic solvents are ethylene glycol, diethylene glycol, triethylene glycol, glycerin, diethylene glycol monobutyl ether, triethylene glycol monobutyl ether, triethanolamine, and 2-pyrrolidinone, 1,5-pentanediol and 1,2-hexanediol.

Said ink comprises at least one of the water-soluble dyes such as direct dyes, acidic dyes, basic dyes, reactive dyes or food dyes of ink-jets. The concentration of dyes in said ink is commonly from 0.1 to 5 percent.

In order to improve wettability to recording sheets, the surface tension of said ink is commonly in the range of $2.5\times10^{-4}$ to $6.0\times10^{-4}$ N/m at 20° C., and is preferably in the range of $3.0\times10^{-4}$ to $5.0\times10^{-4}$ N/m.

In order to improve solubility dyes in said ink, it is preferable that the pH be maintained at no lower than 7. In order to adjust the pH to the desired value, pH regulators may be employed.

Listed as other additives of said ink are, for example, sequestering agents, antifungal agents, viscosity modifying agents, surface tension adjusting agents, wetting agents, surface active agents, and antirusting agents. The concentration of these additives in said ink is generally from 0.01 to 5 percent.

The preferable maximum ink ejection amount of the present invention is from 10 to 35 ml/$m^2$.

EXAMPLES

The invention is concretely described below referring examples. In the examples, "%" is "% by weight" as long as no specific description is accompanied.

Example 1

Preparation of Polymer Dispersion L-1

Into a flask attached with a stirrer and a dropping funnel, 300 parts of purified water and heated by 80° C., and then a mixture of 45 parts of n-butyl acrylate, 55 parts of ethyl methacrylate and 6 parts of alkyltrimethylammonium chloride (an emulsifying agent) and 10 ml of a 5% aqueous solution of 2,2'-azobis-4-cyanovaleric acid as a polymerization initiator were continuously added spending for 30 minutes while stirring, and the reaction was performed for 4 hours. The calculated Tg and the average particle diameter of thus obtained polymer dispersion were each −1° C. and 20 nm, respectively.

Preparation of Polymer Dispersions L-2 Through L-4

Polymer Dispersions L-2 through L-4 were prepared in the same manner as in L-1 except that the monomer and the emulsifying agent were changed as shown in Table 1.

Preparation of Organic Filler Dispersions EM-1 and EM-2

Organic Filler Dispersions EM-1 and EM-2 were prepared in the same manner as in L-1 except that the monomer and the emulsifying agent were changed as shown in Table 1.

TABLE 1

| | | L-1 | L-2 | L-3 | L-4 | EM-1 | EM-2 |
|---|---|---|---|---|---|---|---|
| Emulsifying agent (Adding amount) | | ATMAC (6 parts) | POEAE (8 parts) | ATMAC (6 parts) | POEAE (2 parts) | ATMAC (5 parts) | ATMAC (5 parts) |
| Monomer composition (Part) | Ethyl methacrylate | 55 | 25 | 20 | 30 | | |
| | n-butyl acrylate | 45 | 65 | 20 | 35 | 10 | |
| | Methyl methacrylate | | 10 | 60 | 35 | | 20 |
| | Styrene | | | | | 50 | 80 |
| | 2-hydroxyethyl methacrylate | | | | | 20 | |
| | t-butyl methacrylate | | | | | 20 | |
| Tg (° C.) | | −1 | −21 | 50 | 20 | 76 | 101 |
| Particle diameter (nm) | | 20 | 45 | 20 | 70 | 30 | 30 |

ATMAC: Alkyltrimethylammonium chloride
POEAE: Polyoxyethylene alkyl ether

Preparation of Inorganic Filler Dispersion 1

In 100 g of a 15%-aqueous solution of cationic polymer P-1, 500 g of a 25%-aqueous dispersion of silica fine particle QS-20, produced by Tokuyama Co., Ltd., having a average diameter of primary particle of 20 nm and a diffraction index of approximately 1.45 and then 3.0 g of boric acid and 0.7 g of borax were added and the mixture was dispersed by a high-speed homogenizer. Thus clear bluish white Inorganic Filler Dispersion 1 was prepared.

Preparation of Coating Liquid 1

To 610 g of Inorganic Filler Dispersion 1 heated by 45° C., 5 ml of a 10%-aqueous solution of poly(vinyl alcohol) PVA203, produced by Kraray Co., Ltd., and 290 ml of a 6%-aqueous solution of another poly(vinyl alcohol) of polymerization degree of 4,000, each heated by 45° C. were added, and then water was added so that the total volume of the liquid was made up to 1,000 ml. Thus translucent Coating Liquid 1 was prepared.

Preparation of Inorganic Filler Dispersion 2

Clear bluish white Inorganic Filler Dispersion 2 was prepared in the same manner as in Inorganic Filler Dispersion 1 except that the cationic polymer is replaced by P-2.

P-1

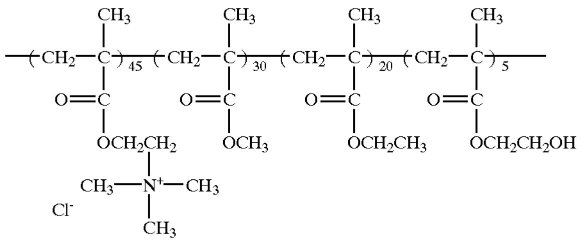

P-2

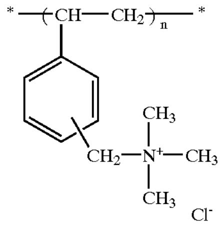

Preparation of Coating Liquid 2

To 610 g of Inorganic Filler Dispersion 2 heated by 45° C., 5 ml of a 10%-aqueous solution of poly(vinyl alcohol) PVA203, produced by Kraray Co., Ltd., and 290 ml of a 6%-aqueous solution of another poly(vinyl alcohol) of polymerization degree of 4,000, each heated by 45° C. were added, and then 20 g of Polymer Dispersion L-1 having a solid content of 20% was added. Thereafter, water was finally added so that the total volume of the liquid was made up to 1,000 ml. Thus translucent Coating Liquid 2 was prepared.

Preparation of Recording Paper 1

The Coating Liquid 1 and 2 were simultaneously coated according to the following conditions to prepare Recording Paper 1.

Support: Paper Support laminated by a polyethylene layer on both surfaces thereof having a thickness of 230 μm First layer (Lower layer): Coating Liquid 1 with a wet layer thickness of 80 μm Second layer (Upper layer): Coating Liquid 2 with a wet layer thickness of 80 μm Coating method: Slide hopper coating method Preparation of Recording Paper 2 through 7

Recording Papers 2 through 7 were prepared in the same manner as in Recording Paper 1 except that the following point was changed in each of the samples.

Recording Paper 2: Polymer Dispersion L-2 was used in place of Polymer Dispersion L-1 in Coating Liquid 2.

Recording Paper 3: Zinc oxide FINEX, produced by Sakai Kagaku Co., Ltd., with an average particle diameter of 40 nm and a diffractive index of from 1.9 to 2.0 was used in place of the silica in Inorganic Filler Dispersion 2.

Recording Paper 4: Polymer Dispersion L-1 was omitted from Coating Liquid 2.

Recording Paper 5: The adding amount of the 6% aqueous solution of poly(vinyl alcohol) of polymerization degree of 4,000 to Coating Liquid 2 was changed to 375 ml and Polymer Dispersion L-1 was omitted from Coating Liquid 2.

Recording Paper 6: Polymer Dispersion L-1 in Coating Liquid 2 was replaced by L-3.

Recording Paper 7: Polymer Dispersion L-1 in Coating Liquid 2 was replaced by L-4.

Preparation of Coating Liquid 3

To prepare Coating Liquid 3, 165 g of Organic Filler Dispersion EM-1, 65 g of Inorganic Filler Dispersion 2 and 12 g of Polymer Dispersion L-1 were mixed and made up to 1,000 ml by addition of water.

Preparation of Recording Paper 8

Coating Liquid 3 was coated on the recording surface of Recording Paper 4 to prepare Recording Paper 8. The thickness of the newly coated layer was 1 μm in the dry state.

Preparation of Recording Papers 9 through 13

Recording Papers 9 through 13 were prepared in the same manner as in Recording Paper 8 except that the following point was changed in each of the samples.

Recording Paper 9: L-1 in Coating Liquid 3 was replaced by L-2.

Recording Paper 10: EM-1 in Coating Liquid 3 was replaced by EM-2.

Recording Paper 11: L-1 in Coating Liquid 3 was replaced by 40 g of a 6%-aqueous solution poly(vinyl alcohol) PVA 245, produced by Kraray Co., Ltd.

Recording Paper 12: L-1 in Coating Liquid 3 was replaced by L-3.

Recording Paper 13: L-1 in Coating Liquid 3 was replaced by L-4.

Preparation of Ink 1

Ink 1 having the following composition was prepared.

| | |
|---|---|
| Water | 68.5 parts |
| Diethylene glycol monobutyl ether | 12 parts |
| Diethylene glycol | 10 parts |
| Glycerol | 8 parts |
| C.I. Direct Blue 86 | 1 part |
| Surfactant Surfinol 465, (Nissin Chemical Industry Co., Ltd.) | 0.5 parts |

Evaluation of Softness of Layer

Each of Recording Papers 1 through 7 was conditioned at 23° C. and a relative humidity of 20% for 24 hours. The conditioned recording paper was winded around stainless rods each having a diameter of 10 mm, 20 mm, 30 mm and 40 mm so that the recording surface of the paper is toward outside, and the diameter of the rod causing the occurrence of cracks on the ink receiving layer is determined as the index of the softness of the ink receiving layer. A smaller value of the rod diameter corresponds to a higher softness of the ink receiving layer. The recording paper with the crack occurring diameter of 20 mm or less is no problem for the practical use, one with the crack occurring diameter of 30 mm has a possibility of crack occurrence in a dried room. The recording paper of the crack occurring diameter of 40 mm accompanies a problem for practical use.

Evaluation of Print Image Density

On each of Recording Papers 1 through 13, a solid black image was recorded using genuine ink for Printer MJ-800C, and the reflective density of the printed image was measured by green light.

Evaluation of Crack Occurrence

Situation of the crack occurrence in the coated layer at the black image recorded area of each of Recording Papers 8 through 13 was observed through a loupe having a magnification of 10 and ranked according to the following norm.

A: No crack was observed.

B: Small isolated cracks are sparsely observed.

C: Many isolated large cracks are observed.

D: Continued large cracks such as earth crack are observed.

The sample classified into Rank A or B was suitable for practical use with no problem.

Evaluation of Ink Absorbing Ability

The solid black image recorded area of each of Recording Papers 1 through 13 was visually evaluated and judged according to the following norm.

A: No spot was observed at an observation distance of 30 cm.

B: No spot was observed at an observation distance of less than 60 cm.

C: A spot was observed at an observation distance of 60 cm or more.

The sample classified into Rank A or B was suitable for practical use with no problem.

Evaluation of Discoloration

Ink 1 was charged in Ink-Jet Printer MJ-800C, manufactured by Seiko-Epson Co., Ltd., and a solid image was printed onto each of Recorded Papers 4, 8 through 13. The jetted out amount of the ink was 12 ml/$M^2$. Thus obtained image was stood for 6 months near the window of an office room so that the image was not directly irradiated by sun light. The reflective density was measured by monochromatic red light. The ratio of the density of the image before and after the standing, remaining ratio of the density, was determined.

Electron-microscopic Observation

According to electron-microscopic observation on the surface of the coated layer before image recording of each of Recording Papers 1 through 13, innumerable pores each having a diameter of from 5 nm to 100 nm were exist on the surface. In the image recorded area of the recording papers other than Recording Papers 4 and 10, scaledown or number reduction of the pores was observed. The cross section of Recording Paper 4 was observed by the electron microscope and it is confirmed by the image analysis that the average diameter of the inorganic fine particles was 40 nm. Results of the foregoing measurement and evaluation are shown in Tables 2 and 3.

TABLE 2

| Recording paper No. | 1 | 2 | 3 | 4 | 5 | 6 | 7 |
|---|---|---|---|---|---|---|---|
| Softness of layer | 20 or less | 20 or less | 20 or less | 40 | 30 | 40 | 30 |
| Printed image density | 2.3 | 2.1 | 2.0 | 2.3 | 2.3 | 2.3 | 1.7 |

TABLE 2-continued

| Recording paper No. | 1 | 2 | 3 | 4 | 5 | 6 | 7 |
|---|---|---|---|---|---|---|---|
| Ink absorbing ability | A | A | A | A | B | A | A |
| Remarks | Inv. | Inv. | Inv. | Comp. | Comp. | Comp. | Comp. |

Inv.: Inventive,
Comp.: Comparative

TABLE 3

| Recording paper No. | 8 | 9 | 10 | 11 | 12 | 13 | 4 |
|---|---|---|---|---|---|---|---|
| Cracks in layer | A | A | A | A | D | A | |
| Printed image density | 2.3 | 2.2 | 2.3 | 2.3 | 2.3 | 1.8 | |
| Ink absorbing ability | A | A | A | C | A | A | |
| Discoloration | 0.98 | 0.96 | 0.74 | 0.92 | 0.93 | 0.98 | 0.58 |
| Remarks | Inv. | Inv. | Inv. | Comp. | Comp. | Comp. | Comp. |

Inv.: Inventive,
Comp.: Comparative

As is cleared in Tables 2 and 3, the recording papers according to the invention have an excellent softness of the layer and discoloration preventing effect, and have a high ink absorbing speed, and give a high density of the printed image.

In the porous type ink-jet recording paper, both of the high ink absorbing speed and the high resistivity against occurrence of cracks can be obtained and the image degradation caused by a harmful gas can be improved by the invention.

What is claimed is:

1. An ink-jet recording paper comprising a support and a porous ink receiving layer comprising fine filler particles having an average particle diameter of from 5 to 100 nm, wherein the ink receiving layer contains boric acid or a salt thereof and a polymer particle dispersion of a cationic or nonionic polymer having a glass transition point of from −30° C. to 40° C. and an average particle diameter of from 1 nm to 50 nm.

2. The ink-jet recording paper of claim 1, wherein the glass transition point of the cationic or nonionic polymer is not more than 20° C.

3. The ink-jet recording paper of claim 1, wherein the glass transition point of the cationic or nonionic polymer is not more than 0° C.

4. The ink-jet recording paper of claim 1 wherein the average particle diameter of the polymer particle dispersion is from 5 nm to 30 nm.

5. The ink-jet recording paper of claim 1 wherein the porous ink receiving layer has at least two layers and the outermost layer of the porous ink receiving layer contains the polymer particle dispersion.

6. The ink-jet recording paper of claim 1 wherein the porous ink receiving layer has at least two layers, and the outermost layer of the porous ink receiving layer contains the organic fine filler particles.

7. The ink-jet recording paper of claim 1 wherein the organic fine filler particles are capable of being dissolved or swollen by a water-miscible solvent.

8. The ink-jet recording paper of claim 1, wherein a content of the polymer particles is from 0.1 to 30% by weight of the fine filler particles.

9. The ink-jet recording paper of claim 8, wherein the content of the polymer particles is from 0.5 to 15% by weight of the fine filler particles.

10. The ink-jet recording paper of claim 1, wherein the porous ink receiving layer further comprises a hydrophilic binder.

11. The ink-jet recording paper of claim 10, wherein the binder is polyvinylalcohol.

12. The ink-jet recording paper of claim 1, wherein the porous ink receiving layer further comprises a cationic polymer.

13. The ink-jet recording paper of claim 1, wherein the porous ink receiving layer preferably further comprises a hardener.

* * * * *